United States Patent
Flagg

[11] 3,993,317
[45] Nov. 23, 1976

[54] CORE CHUCK

[75] Inventor: Richard Edward Flagg, East Bridgewater, Mass.

[73] Assignee: Double E Company, Inc., Brockton, Mass.

[22] Filed: Dec. 12, 1974

[21] Appl. No.: 532,212

[52] U.S. Cl. .................... 279/2 R; 242/68.2; 242/72.1
[51] Int. Cl.² .................. B23B 31/40; B65H 17/02
[58] Field of Search .............. 242/68.2, 72, 72.1, 242/72 B; 279/2 R, 1 C, 1 S, 1 T, 1 R

[56] References Cited
UNITED STATES PATENTS

| | | | |
|---|---|---|---|
| 842,862 | 2/1907 | Crane | 242/72.1 |
| 1,901,226 | 3/1933 | Carter | 242/72.1 |
| 1,909,323 | 5/1933 | Warren | 279/2 |
| 2,075,192 | 3/1937 | George | 179/2 |
| 2,352,580 | 6/1944 | Wettengel | 242/72.1 X |
| 2,765,175 | 10/1956 | Parker et al. | 279/2 |
| 3,355,121 | 11/1967 | Wright | 242/68.2 |
| 3,658,274 | 4/1972 | Adair | 242/72.1 |
| 3,868,067 | 2/1975 | Cadillon | 242/68.2 |

FOREIGN PATENTS OR APPLICATIONS

| | | | |
|---|---|---|---|
| 1,627,254 | 10/1970 | Germany | 279/2 |
| 958,445 | 1/1957 | Germany | 279/2 |
| 1,150,193 | 6/1963 | Germany | 72/ |

*Primary Examiner*—Othell M. Simpson
*Assistant Examiner*—W. R. Briggs

[57] ABSTRACT

A core chuck comprising radially movable exterior jaw members, means operative in response to a relative rotation between the jaw members and those means to apply a radially outward force to the jaw members, and biasing means for urging the jaw members toward a predetermined radial position. The biasing means comprise a band spring disposed in axially aligned recesses in surfaces of the jaw members, at least one of the recesses being provided with spring retainer means preventing removal of the spring from the recess in a radial direction.

15 Claims, 3 Drawing Figures

CORE CHUCK

This invention relates to improvements in core chucks.

It is a principle object of the present invention to provide an improved core chuck which has a reduced susceptability to malfunction by being fouled or jammed by foreign matter. It is a further object to provide an improved core chuck in which the retention and biasing of the chuck jaws are rendered more reliable and effective.

To achieve these and other objects as will further appear hereinafter, in one aspect of the present invention a core chuck, having a longitudinal axis, comprises radially movable exterior jaw members and means operative, in response to a relative rotation between the jaw members and those means, to apply a radially outward force to the jaw members. Biasing means are provided for urging the jaw members toward a predetermined radial position, the biasing means comprising a band spring disposed in aligned recesses in the surfaces of the jaw members. In preferred embodiments of the invention at least one of those recesses is provided with a spring retainer means which prevents the removal of the spring from the recess in a radial direction; the spring retainer means comprise a circumferentially extending flange at least partially radially overlapping the band spring.

In another aspect of the invention improvements are provided in a core chuck having biasing means as described above or of any conventional design and also including limiting means for limiting the maximum radially outward position of the jaw members. In the improved core chuck the limiting means comprise structure secured against radial movment and including a surface which overlaps an opposed surface of each jaw member. The surface on the limiting means is sloped with respect to the axis of the chuck no less than a predetermined acute angle and each of the opposed surfaces on the jaw members is sloped with respect to the axis of the chuck no greater than that predetermined acute angle. In preferred embodiments, the slope of the surface on the limiting means is approximately 35°, the slope of the opposed surfaces of the jaw members is approximately 30°, and the limiting means comprise a ring disposed adjacent an axial end of the jaw members.

Other objects, features, and advantages of the invention will appear from the following description of particular preferred embodiments taken together with the accompanying drawings. In the drawings.

Figure 1:
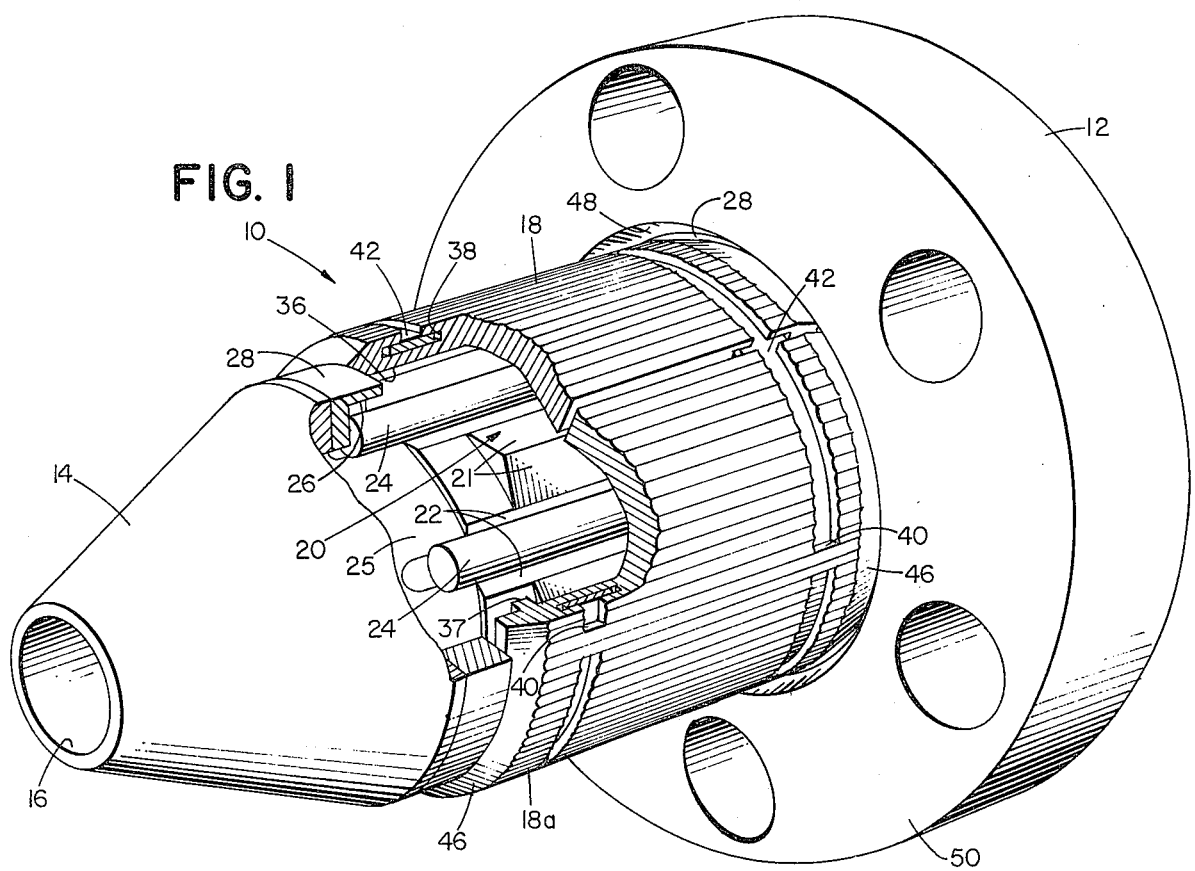
FIG. 1 is a partially broken away perspective view of a core chuck including features according to the present invention.

The drawings illustrate a "turret" type of core chuck 10 which is securable by means of backing plate 12 to an arm of an apparatus for supporting a roll of material wound about a core. While the various features of the present invention will be described with respect to such a turret core chuck, it is to be understood that these features may be equally applicable to use on other forms of core chucks and, in particular, to shaft-mounted core chucks, such as described in my prior U.S. Pat. No. 3,792,868.

Referring to the drawings, the chuck 10 includes a tapered "nose cone" 14 at the end of the chuck 10 which is first inserted into the core (not shown). The nose cone is secured to an interior member of the chuck (further described below) by means of a bolt (not shown) inserted through counter-bore opening 16.

The chuck itself comprises a series (e.g., three) of exterior jaw members 18 and interior means for applying a radial outward force to the jaw members in response to a small relative rotation between the jaw members and those interior means. A particular preferred form of these interior means is illustrated in the drawing and described below, but it should be understood that any conventional means for applying such a force to the jaw members may be utilized in conjunction with the various features of the present invention.

Referring to the interior means for expanding the jaw members 18, an interior member 20 is provided. In the preferred form illustrated, the cross-sectional exterior shape of the axially central portion of interior member 20 is a hexagon having six planar exterior surfaces 21 each parallel to the axis of the chuck. Slight, longitudinally-disposed depressions 22 are provided in the center of each face. The depressions 22 are preferably V-shaped in section and have been exaggerated in depth in the drawings for clarity. A roller 24 is disposed on each face 21 of the hexagon, each roller extending beyond the ends of the hexagonal portion of member 20 to partially overlie the cylindrical end portions 25. The ends of each roller are disposed in recesses 26 in roller orienting rings 28 which are disposed about cylindrical portions 25. Jaw members 18 are disposed around the rollers 24 but are longitudinally shorter thereby providing exposed roller end portions for engagement by rings 28. Each of the three jaw members 18 has an arcuate inner surface 36 which is in contact with two neighboring rollers 24.

One jaw member 18a is also provided with axially spaced pairs of lugs 37 which project radially inwardly from the arcuate interior surface 36. The lugs maintain the orientation of the jaw members with respect to the set of the rollers (themselves constrained with respect to each other by the rings 28). Aligned, circumferential grooves 38 are provided in surfaces of the jaw members 18. In one jaw member (i.e., 18a) each groove is provided with a barrier 40. A split spring steel band 42 is disposed in each set of aligned grooves with opposite band ends on opposite sides of barrier 40.

Figure 2:
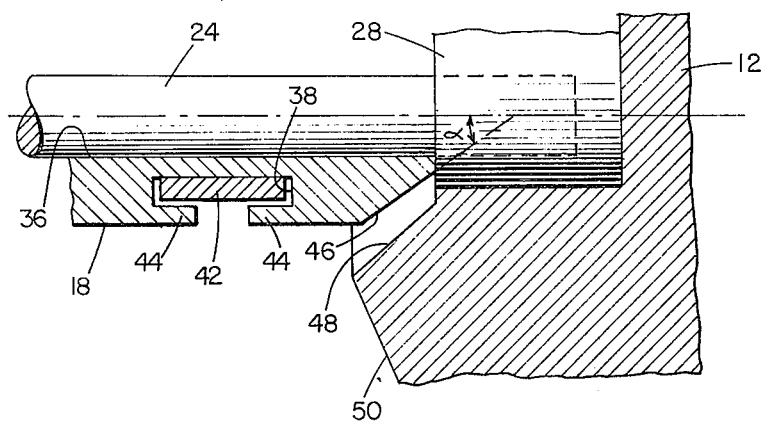
FIG. 2 is an enlarged partially broken away view of a portion of the core chuck of FIG. 1.

As best seen in FIG. 2, the groove 38 is disposed within the jaw members 18 beneath a pair of circumferentially extending flanges 44 which are integral with the jaw member 18 and which radially overlap the band spring 42 thereby serving as spring retainer means which prevent the removal of the spring from the groove in a radial direction. Alternatively, a similar arrangement of groove 38, spring 42, and flanges 44 may be provided on the inner arcuate surfaces 36 of the jaw 18 (see FIG. 3). With either arrangement, the band spring 42 may bias the jaw members in either a radially inward or radially outward direction.

Figure 3:
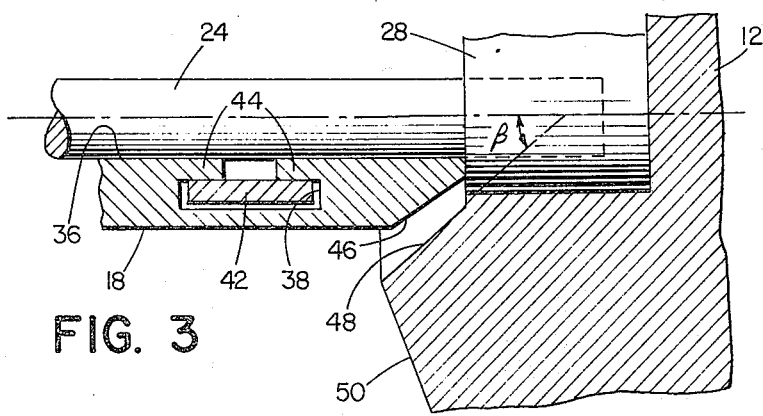
FIG. 3 is a view similar to FIG. 2 illustrating an alternative embodiment of a core chuck constructed according to the present invention.

Referring to FIGS. 2 and 3, it will be seen that in preferred embodiments the jaw members 18 are provided with circumferentially extending sloping surfaces 46 adjacent their longitudinal ends and opposed to sloping surface 48 of back plate 12 which radially overlaps the surfaces 46. The surface 48 serves as a limiting means which define the maximum radial expansion of the jaw members 18 (when the jaw member surfaces 46 engage the surface 48). Each of the surfaces 46 and 48 is sloped with respect to the axis of the chuck at an acute angle with the slope angle α of surface 46 being no greater than, and preferably slightly less than, the slope angle β of surface 48. In one particular preferred embodiment the slope angle α of surface 46 is approximately 30° and the slope angle α of surface 48 is approximately 35°. With the sloped arrangement of these surfaces, particulate matter which may find its way into the space between surfaces 46 and 48 will be forced out of that space with a wedging action as the surface 46 engages the surface 48 during the expansion of the jaw members 18. This arrangement thus renders the limiting means self-cleaning.

Referring again to FIGS. 2 and 3, it will be seen that the surface 50 of back plate 12 and the side of the back plate toward the chuck 10 is sloped away from the chuck 10 (preferably making an angle of approximately 20° with the vertical as viewed in FIGS. 2 and 3). This arrangement of the back plate assures full insertion of the chuck 10 into the core even if the end of the core is damaged or somewhat recessed within the roll of material wound around the core.

The provision of spring retaining means 44 adjacent the spring groove 38 not only prevents undesired removal of the spring from the groove during use of the chuck but permits a choice of jaw member biasing directions. Thus, with this arrangement, outward biasing of the jaw members 18 is possible even with the groove 38 on the exterior surface of the jaw members 18 (FIG. 2) and inward biasing of the jaw members 18 is possible even with the groove 38 on the interior surface of the jaw members 18 (FIG. 3). The choice of biasing direction for the jaw members 18 may depend upon a number of factors, as is known in the art, including the load to be borne by the chuck. Thus, it has been found that with very light loads an outward biasing of the jaw members 18 with the springs 42 disposed around the outside of the jaw members (see FIG. 2) results in excellent chuck performance.

While particular preferred embodiments of the present invention have been illustrated in the accompanying drawings and described in detail herein, other embodiments are within the scope of the invention and the following claims:

What is claimed is:

1. In a core chuck having a longitidinal axis and comprising radially movable exterior jaw members, means operative in response to a relative rotation between said jaw members and said means to apply a radially outward force to said jaw members, and biasing means for urging said jaw members toward a predetermined radial position, the improvement wherein:
    said jaw members define aligned recesses in one of the inner and outer surfaces thereof;
    said biasing means comprise a band spring engaging all of said jaw members and disposed in said aligned recesses; and,
    at least one of said recesses is provided with spring retainer means preventing removal of said spring from said one recess in a radial direction and permitting movement of said spring relative to said one recess in a circumferential direction, said spring retainer means comprising a stop projecting axially from a said side of said recess, and overlapping and being arranged to engage a radially-facing surface of said spring.

2. The core chuck of claim 1 wherein said recesses are provided in the inner surfaces of said jaw members.

3. The core chuck of claim 2 wherein said spring retainer means comprise stops projecting axially from opposite sides of said one recess.

4. The core chuck of claim 1 wherein said biasing means engages said jaw members and biases said jaw members in a radially outward direction from said axis.

5. The core chuck of claim 1 wherein said recesses are provided in the outer surfaces of said jaw members.

6. The core chuck of claim 5 wherein said spring retainer means comprise stops projecting axially from opposite sides of said one recess.

7. In a core chuck having a longitudinal axis and comprising radially movable exterior jaw members, means operative in response to a relative rotation between said jaw members and said means to apply a radially outward force to said jaw members, and biasing means for urging said jaw members toward a predetermined radial position, the improvement wherein:
    said jaw members define aligned recesses in one of the inner and outer surfaces thereof;
    said biasing means comprise a band spring engaging all of said jaw members and disposed in said aligned recesses; and,
    at least one of said recesses is provided with spring retainer means preventing removal of said spring from said one recess in a radial direction and permitting movement of said spring relative to said one recess in a circumferential direction, said spring retainer means comprising circumferentially-extending flanges projecting axially from opposite sides of said one recess and at least partially overlapping said band spring.

8. The core chuck of claim 7 wherein said recesses are provided in the outer surfaces of said jaw members, each of said recesses is provided with a spring retainer means, and each of said spring retainer means comprises circumferentially-extending flanges projecting generally axially from opposite sides of said each recess and partially overlapping a said spring.

9. The core chuck of claim 7 wherein said recesses are provided in the inner surfaces of said jaw members and each said recess is provided with a said spring retainer means comprising said flanges.

10. In a core chuck having a longitudinal axis and comprising radially movable exterior jaw members, means operative in response to a relative rotation between said jaw members and said means to apply a radially outward force to said jaw members, limiting means for limiting the maximum radially outward position of said jaw members and including structure secured against radial movement relative to said axis and defining a plurality of limiting surface portions each of which overlaps an opposed surface portion defined by a respective one of said jaw members, and biasing means for urging said jaw members toward a predetermined radial position, that improvement wherein:
    each of said opposed surface portions extends from adjacent a radially outward surface of said respective one of said jaw members towards said axis and is sloped with respect to said axis at a first predetermined acute angle;
    each of said limiting surface portions is generally parallel to a respective one of said opposed surface portions and is sloped with respect to said axis at second predetermined acute angle; and, said second acute predetermined angle is greater than said first acute predetermined angle.

11. The core chuck of claim 10 wherein said predetermined acute angle is between approximately 30° and approximately 40°.

12. The core chuck of claim 10 wherein said limiting means comprise a ring disposed adjacent an axial end of said jaw members.

13. The core chuck of claim 10 wherein said limiting means comprise a ring disposed adjacent an axial end of said jaw members, and a ring defines an interior circumferentially extending surface defining said limiting surface portions.

14. The core chuck of claim 10 wherein said predetermined acute angles are in the range of 30° to 40°.

15. The core chuck of claim 14 wherein said second acute angle is about 5° greater than said first acute angle.

* * * * *

UNITED STATES PATENT AND TRADEMARK OFFICE
CERTIFICATE OF CORRECTION

PATENT NO. : 3,993,317
DATED : November 23, 1976
INVENTOR(S) : Richard Edward Flagg It is certified that error appears in the above–identified patent and that said Letters Patent are hereby corrected as shown below:

Column 3, line 9, change "α" to --β--.

Signed and Sealed this

Fifteenth Day of February 1977

[SEAL]

Attest:

RUTH C. MASON
*Attesting Officer*

C. MARSHALL DANN
*Commissioner of Patents and Trademarks*